US010811907B2

(12) United States Patent
Du et al.

(10) Patent No.: US 10,811,907 B2
(45) Date of Patent: Oct. 20, 2020

(54) FAULT PROTECTION METHOD AND WIRELESS POWER TRANSMISSION DEVICE USING SAME

(71) Applicant: Delta Electronics (Thailand) Public Company Limited, Samuptrakarn (TH)

(72) Inventors: Shuailin Du, Samutprakarn (TH); Yongkai Liao, Samutprakarn (TH); Kai Dong, Samutprakarn (TH); Jinfa Zhang, Samutprakarn (TH)

(73) Assignee: DELTA ELECTRONICS (THAILAND) PUBLIC COMPANY LIMITED, Samutprakarn (TH)

(*) Notice: Subject to any disclaimer, the term of this patent is extended or adjusted under 35 U.S.C. 154(b) by 268 days.

(21) Appl. No.: 15/958,978

(22) Filed: Apr. 20, 2018

(65) Prior Publication Data
US 2019/0222064 A1 Jul. 18, 2019

(30) Foreign Application Priority Data

Jan. 12, 2018 (CN) .......................... 2018 1 0031348

(51) Int. Cl.
*H02J 50/12* (2016.01)
*H02J 7/00* (2006.01)
(Continued)

(52) U.S. Cl.
CPC .............. *H02J 50/12* (2016.02); *H02H 3/00* (2013.01); *H02J 7/0026* (2013.01);
(Continued)

(58) Field of Classification Search
CPC .......... H02J 50/12; H02J 7/025; H02J 7/0031; H02J 7/0026; H02J 7/00304; H02J 50/10;
(Continued)

(56) References Cited

U.S. PATENT DOCUMENTS

2017/0085133 A1* 3/2017 Byun ...................... H02J 50/12
2019/0341814 A1* 11/2019 Akuzawa ................ H01F 38/14

FOREIGN PATENT DOCUMENTS

| CN | 104578441 A | 4/2015 |
| CN | 105099001 | * 11/2015 |

(Continued)

*Primary Examiner* — Jared Fureman
*Assistant Examiner* — Emmanuel Dominique
(74) *Attorney, Agent, or Firm* — Kirton McConkie; Evan R. Witt

(57) ABSTRACT

A wireless power transmission device includes a transmitter unit and a receiver unit. The transmitter unit converts an input DC power into an inverted AC power, the receiver unit receives the AC power through a coupling effect. A fault protection method is also provided in the present disclosure. If the receiver unit is abnormal, a main power circuit of the receiver unit is short-circuited. Then, a phase relationship between an inverted AC voltage and an inverted AC current of the inverted AC power is detected. A phase judgment signal is generated according to the phase relationship. An overcurrent judgment signal is generated according to the amplitude of the inverted AC current and a predetermined current threshold. A fault signal is generated according to the phase judgment signal and the overcurrent judgment signal. In response to the fault signal, the wireless power transmission device is controlled to shut down.

19 Claims, 12 Drawing Sheets

(51) Int. Cl.
*H02H 3/00* (2006.01)
*H04B 5/00* (2006.01)
*H02J 7/02* (2016.01)

(52) U.S. Cl.
CPC ............ *H02J 7/0031* (2013.01); *H02J 7/025* (2013.01); *H04B 5/0037* (2013.01); *H02J 7/00304* (2020.01)

(58) Field of Classification Search
CPC ...... H04B 5/0037; H02H 3/00; H02H 7/1227; H02H 3/382; H02H 3/08; H02H 7/00
See application file for complete search history.

(56) References Cited

FOREIGN PATENT DOCUMENTS

| | | |
|---|---|---|
| CN | 105099001 A | 11/2015 |
| CN | 105680578 A | 6/2016 |

* cited by examiner

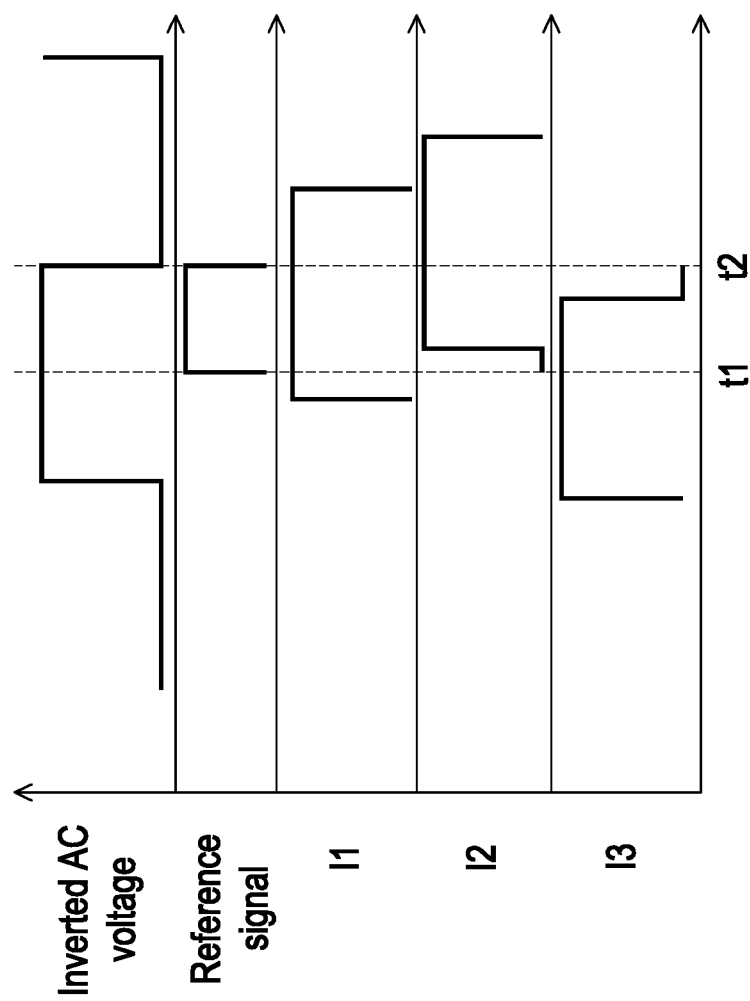

FAULT PROTECTION METHOD AND WIRELESS POWER TRANSMISSION DEVICE USING SAME

CROSS-REFERENCE TO RELATED APPLICATION

This application claims priority to China Patent Application No. 201810031348.5, filed on Jan. 12, 2018, the entire content of which is incorporated herein by reference for all purposes.

FIELD OF THE DISCLOSURE

The present disclosure relates to a wireless power transmission device and a fault protection method, and more particularly to a wireless power transmission device and a fault protection method for quickly protecting the wireless power transmission device.

BACKGROUND OF THE DISCLOSURE

With increasing development of science and technology, wireless power transmission device has been disclosed, which includes a wireless power transmission part. The wireless power transmission part comprises a transmitter unit and a receiver unit, which are separated with each other spatially, so the wireless power transmission device can provide more reliable, more convenient, safer and more automatic electric power, when compared with the wired power supply. In case that the wireless power transmission device is abnormal, it is important to quickly protect the wireless power transmission device.

Since the transmitter unit and the receiver unit are separated from each other through a specified physical distance, and the power is transmitted from the transmitter unit to the receiver unit, the receiver unit protection needs to be achieved by shutting transmission unit power, which makes the fault detection more difficult. When the receiver unit occurs the fault, a fault protection method will be employed to protect the wireless power transmission device. In a first conventional method, a fault signal is transmitted from the receiver unit to the transmitter unit through a wireless communication. According to the fault signal, associated protection action is made to protect the wireless power transmission device. In a second conventional method, the receiver unit is coupled with an active-detuning capacitor array in parallel. When the receiver unit occurs the fault, the control part changes a corresponding capacitance of the active-detuning capacitor array. According to the time difference of the voltage/current zero-crossing point, the transmitter unit realizes that the receiver unit has the fault. Consequently, associated protection action is made to protect the wireless power transmission device. In a third conventional method, the receiver unit is additionally equipped with an electronic component. When the receiver unit occurs the fault, the control part makes the winding of the receiver unit be short-circuited using the additional electronic component, then the current flowing through the winding of the transmitter unit increases. By detecting the current increase of the winding of the transmitter unit, the transmitting unit realizes that the receiver unit has the fault. Consequently, associated protection action is made to protect the wireless power transmission device.

However, the above conventional fault protection methods still have some drawbacks. For example, the first method has to transmit the fault signal through the wireless communication. As known, the response speed of protection is restricted by the fault signal transmission speed of wireless communication. Because of the time delay of the wireless communication, the wireless power transmission device cannot be protected in real time. Moreover, if the wireless communication is interfered, the efficacy of protecting the wireless power transmission device is adversely affected. The second method is only applied to some specified voltage/current statuses. Moreover, since many bidirectional switches are required, the second method is not cost-effective and the control strategy is complex and difficult. The third method is feasible only for the state that the current through the winding of the transmitter unit increases due to the winding of the receiver unit is short-circuited. In other words, the applications of the third method are also limited.

Therefore, there is a need of providing an improved fault protection method and a wireless power transmission device using the fault protection method.

SUMMARY OF THE DISCLOSURE

The present disclosure provides a fault protection method for a wireless power transmission device. In case that a receiver unit of the wireless power transmission device is abnormal, a transmitting side of the wireless power transmission device realizes that the receiver unit is abnormal through detection. Regardless of the working state of the wireless power transmission device, quick protection of the wireless power transmission device can be achieved.

In accordance with an aspect of the present disclosure, there is provided a fault protection method for a wireless power transmission device. The wireless power transmission device includes a transmitter unit and a receiver unit. The transmitter unit receives an input DC power and comprises a switching inverter circuit for converting the input DC power into an inverted AC power. The receiver unit includes a main power circuit. The fault protection method includes the following steps. In a step (a), whether the receiver unit is abnormal is detected after the wireless power transmission device starts to work. When the receiver unit is abnormal, the main power circuit of the receiver unit is short-circuited. In a step (b), the transmitter unit detects a phase relationship between an inverted AC voltage and an inverted AC current of the inverted AC power and detects an amplitude of the inverted AC current. In a step (c), a phase judgment signal is generated according to the phase relationship between the inverted AC voltage and the inverted AC current. In a step (d), an overcurrent judgment signal is generated according to the amplitude of the inverted AC current and a predetermined current threshold. In a step (e), a fault signal is generated according to the phase judgment signal and the overcurrent judgment signal. In a step (f), the wireless power transmission device is controlled to shut down in response to the fault signal.

In accordance with another aspect of the present disclosure, there is provided a wireless power transmission device. The wireless power transmission device includes a transmitter unit, a receiver unit, a phase detection circuit, an amplitude detection circuit and a fault protection module. The transmitter unit receives an input DC power. The transmitter unit includes a switching inverter circuit for converting the input DC power into an inverted AC power. The receiver unit includes a main power circuit. The phase detection circuit is electrically coupled with an output terminal of the switching inverter circuit. The phase detection circuit detects a phase relationship between an inverted AC voltage and an inverted AC current of the inverted AC power and generates a phase judgment signal according to the phase relationship. The amplitude detection circuit is electrically coupled with the output terminal of the switching inverter circuit. The amplitude detection circuit detects an amplitude of the inverted AC current and generates an overcurrent judgment signal according to the amplitude of the inverted AC current and a predetermined current threshold. The fault protection module is electrically coupled with the phase detection circuit and the amplitude detection circuit, and receives the phase judgment signal and the overcurrent judgment signal. If the receiver unit is abnormal, the main power circuit is short-circuited and the fault protection module generates a fault signal according to the phase judgment signal and the overcurrent judgment signal. The wireless power transmission device is disabled in response to the generated fault signal.

The above contents of the present disclosure will become more readily apparent to those ordinarily skilled in the art after reviewing the following detailed description and accompanying drawings, in which:

BRIEF DESCRIPTION OF THE DRAWINGS

FIGS. 9A and 9B are schematic timing waveform diagrams illustrating the inverted AC voltage, the reference signal and the zero-crossing detection signal processed by the fault protection method of FIG. 8.

DETAILED DESCRIPTION

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
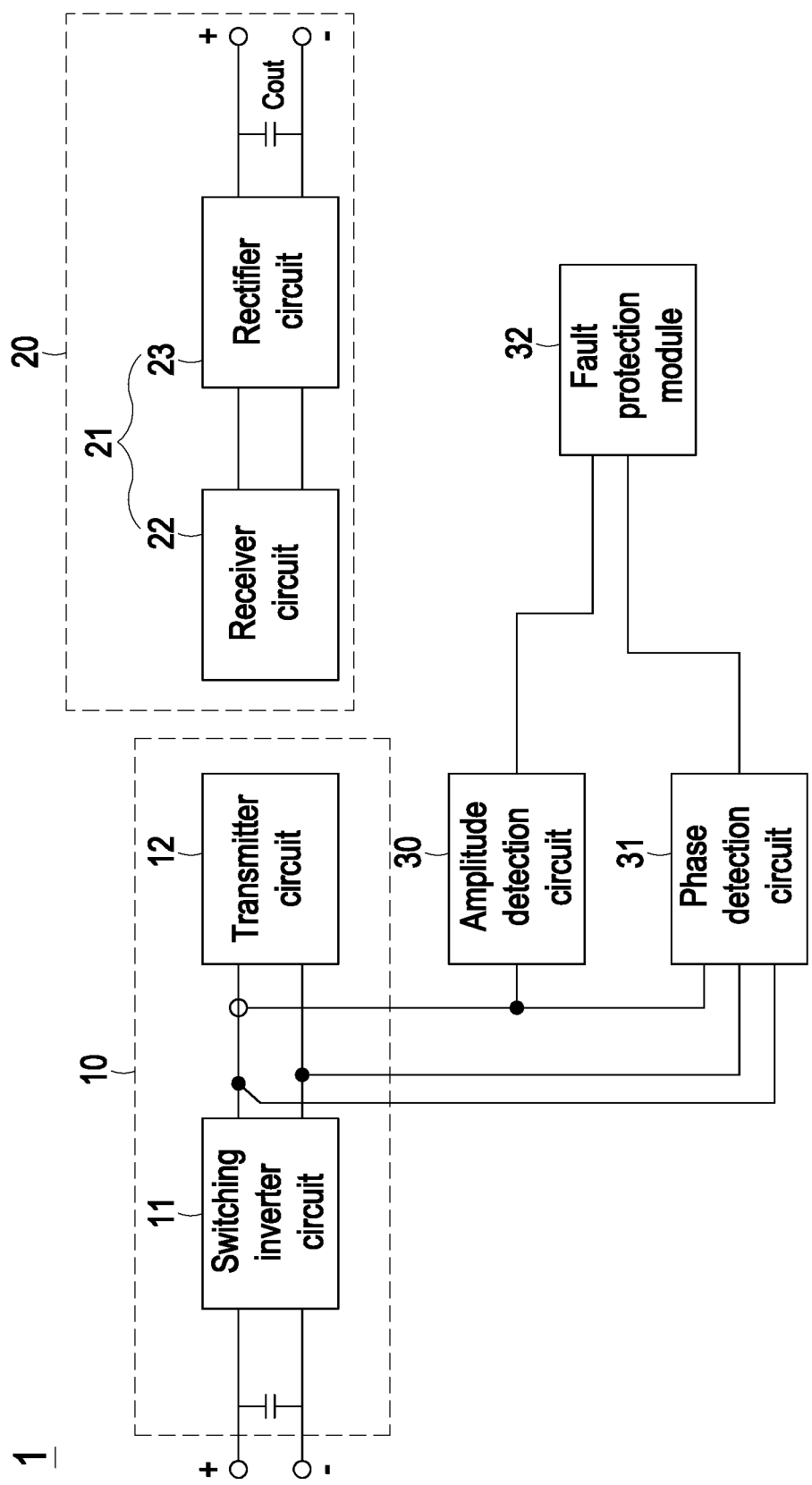
FIG. 1 is a schematic circuit diagram illustrating a wireless power transmission device according to an embodiment of the present disclosure.

FIG. 1 is a schematic circuit diagram illustrating a wireless power transmission device according to an embodiment of the present disclosure. As shown in FIG. 1, the wireless power transmission device 1 comprises a transmitting side and a receiving side. The transmitting side is used for receiving an input DC power and converting the input DC power into an AC power. The receiving side receives the AC power from the transmitting side through a coupling effect. After the AC power is converted and filtered, a regulated power is provided to a load. The transmitting side of the wireless power transmission device 1 comprises a transmitter unit 10, an amplitude detection circuit 30, a phase detection circuit 31 and a fault protection module 32. The receiving side of the wireless power transmission device 1 comprises a receiver unit 20.

The transmitter unit 10 comprises a switching inverter circuit 11. The switching inverter circuit 11 receives the input DC power. The switching inverter circuit 11 comprises plural switches (not shown). According to the switching actions of the switches of the switching inverter circuit 11, the input DC power is converted into an inverted AC power. The inverted AC power contains an inverted AC voltage and an inverted AC current.

The receiver unit 20 receives the inverted AC power from the transmitter unit 10 through a coupling effect and performs an associated processing operation. The receiver unit 20 comprises a main power circuit 21. The main power circuit 21 receives the inverted AC power from the transmitter unit 10 through the coupling effect and rectifies the inverted AC power.

In an embodiment, the transmitter unit 10 comprises a transmitter circuit 12. The transmitter circuit 12 is electrically coupled with an output terminal of the switching inverter circuit 11. The main power circuit 21 of the receiver unit 20 further comprises a receiver circuit 22 corresponding to the transmitter circuit 12. The transmitter circuit 12 wirelessly transmits the electric power to the receiver circuit 22 through the coupling effect. For example, the coupling effect includes an electromagnetic coupling effect or a resonant coupling effect.

The amplitude detection circuit 30 is electrically coupled with the output terminal of the switching inverter circuit 11. The amplitude detection circuit 30 is used to detect the amplitude of the inverted AC current from the switching inverter circuit 11. Moreover, the amplitude detection circuit 30 generates an overcurrent judgment signal according to the amplitude of the inverted AC current and a predetermined current threshold.

In an embodiment, the amplitude detection circuit 30 compares the amplitude of the inverted AC current with the predetermined current threshold. If the amplitude of the inverted AC current is higher than the predetermined current threshold, the amplitude detection circuit 30 generates an overcurrent judgment signal with high level. Whereas, if the amplitude of the inverted AC current is lower than the predetermined current threshold, the amplitude detection circuit 30 generates an overcurrent judgment signal with low level.

The phase detection circuit 31 is electrically coupled with the output terminal of the switching inverter circuit 11. The phase detection circuit 31 is used to detect the phase relationship between the inverted AC voltage and the inverted AC current of the inverted AC power and to generate a phase judgment signal according to the phase relationship. The phase judgment signal indicates whether the phase of the inverted AC current leads the phase of the inverted AC voltage, or indicates whether the phase of the inverted AC current lags the phase of the inverted AC voltage by more than 90 degrees. For example, the phase detection circuit 31 realizes the phase relationship between the inverted AC voltage and the inverted AC current according to comparison. If the phase of the inverted AC current leads the phase of the inverted AC voltage or the phase of the inverted AC current lags the phase of the inverted AC voltage by more than 90 degrees, the phase detection circuit 31 generates a phase judgment signal with high level. Whereas, if the phase of the inverted AC current lags the phase of the inverted AC voltage by less than 90 degrees, the phase detection circuit 31 generates a phase judgment signal with low level.

The fault protection module 32 is electrically coupled with the amplitude detection circuit 30 and the phase detection circuit 31. The fault protection module 32 receives the phase judgment signal from the phase detection circuit 31 and the overcurrent judgment signal from the amplitude detection circuit 30. Moreover, the fault protection module 32 performs a logic OR operation on the phase judgment signal and the overcurrent judgment signal. If any of the phase judgment signal and the overcurrent judgment signal is in a high-level state, a fault signal is generated. In response to the fault signal, the wireless power transmission device 1 is controlled to shut down.

Figure 2:
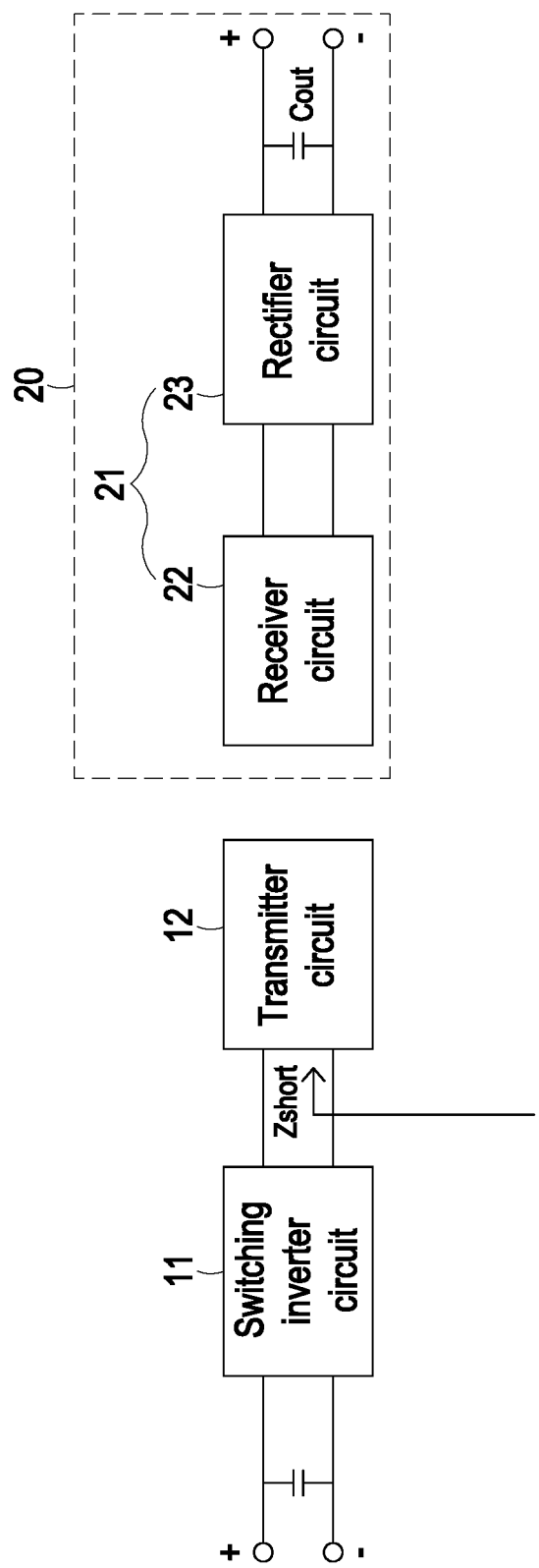
FIG. 2 is a schematic circuit diagram illustrating the relationship between the transmitter unit and the receiver unit of the wireless power transmission device of FIG. 1, in which the main power circuit is short-circuited.

In case that the receiver unit 20 is abnormal, the main power circuit 21 is short-circuited. FIG. 2 is a schematic circuit diagram illustrating the relationship between the transmitter unit and the receiver unit of the wireless power transmission device of FIG. 1, in which the main power circuit is short-circuited. Under this circumstance, the transmitter circuit 12 and the receiver unit 20 are in a short-circuited network with an impedance Zshort. The inverted AC voltage from the switching inverter circuit 11 is applied to the short-circuited network. Consequently, the amplitude and/or the phase of the inverted AC current are subjected to a change. That is, the transmitting side of the wireless power transmission device 1 judges whether the receiver unit 20 is abnormal according to the amplitude of the inverted AC current and the phase relationship between the inverted AC voltage and the inverted AC current. In case that an output voltage from the receiver unit 20 exceeds a predetermined value or the receiver unit 20 is short-circuited, it means that the receiver unit 20 is abnormal.

In case that the receiver unit 20 of the wireless power transmission device 1 is abnormal, the amplitude of the inverted AC current or the phase relationship between the inverted AC voltage and the inverted AC current is determined according to the working state of the wireless power transmission device 1. In an embodiment, the working state of the wireless power transmission device 1 is determined according to the relationship between a switching frequency of the switching inverter circuit 11 and a resonant frequency of the short-circuited network. In addition, the amplitude of the inverted AC current or the phase relationship between the inverted AC voltage and the inverted AC current will be described as follows.

If the switching frequency is lower than the resonant frequency, there will be a situation that the phase of the inverted AC current leads the phase of the inverted AC voltage.

If the switching frequency is equal to the resonant frequency, the amplitude of the inverted AC current increases rapidly.

If the switching frequency is higher than the resonant frequency, there will be a situation that the phase of the inverted AC current lags the phase of the inverted AC voltage by more than 90 degrees.

Regardless of the working state of the wireless power transmission device 1, at least one of the phase judgment signal and the overcurrent judgment signal is in the high-level state when the receiver unit 20 is abnormal. According to the phase judgment signal and the overcurrent judgment signal, the fault protection module 32 realizes that the receiver unit 20 is abnormal and generates the fault signal. In response to the fault signal, the wireless power transmission device 1 is controlled to shut down. Consequently, quick protection of the wireless power transmission device 1 can be achieved.

Please refer to FIG. 1 again. The main power circuit 21 of the receiver unit 20 further comprises a rectifier circuit 23. The rectifier circuit 23 is electrically coupled with the receiver circuit 22. For example, the rectifier circuit 23 is a full-wave rectifier circuit or a full-bridge rectifier circuit. After the main power circuit 21 receives the inverted AC power, the inverted AC power is rectified by the rectifier circuit 23. When the receiver unit 20 is abnormal, the main power circuit 21 is short-circuited by the rectifier circuit 23.

Figure 3A:
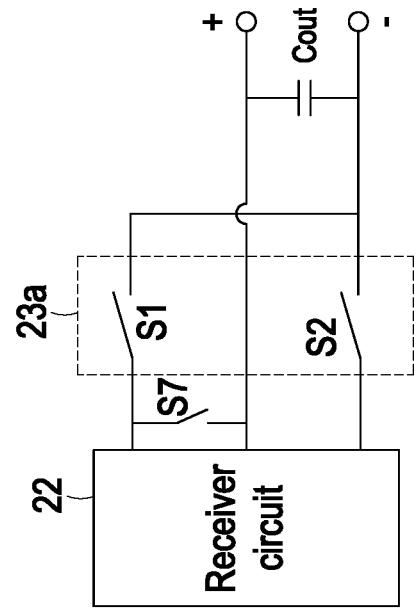
FIGS. 3A, 3B, 3C, 3D and 3E are schematic circuit diagrams illustrating some examples of the receiver unit of the wireless power transmission device according to the embodiment of the present disclosure.

FIGS. 3A, 3B, 3C, 3D and 3E are schematic circuit diagrams illustrating some examples of the receiver unit of the wireless power transmission device according to the embodiment of the present disclosure. As shown in FIG. 3A, the rectifier circuit 23a is a full-wave rectifier circuit comprising a first switch S1 and a second switch S2. A first terminal of the first switch S1 is coupled with a first terminal of the receiver circuit 22. A second terminal of the first switch S1 is coupled with a second terminal of the second switch S2 and a second terminal of an output capacitor Cout. A first terminal of the second switch S2 is electrically coupled with a third terminal of the receiver circuit 22. A first terminal of the output capacitor Cout is electrically coupled with a second terminal of the receiver circuit 22. In case that the receiver unit 20 is abnormal, the first switch S1 or the second switch S2 is turned on under control of the rectifier circuit 23a. Consequently, in case that the output capacitor Cout is not short-circuited, and the main power circuit 21 is short-circuited.

Figure 3B:
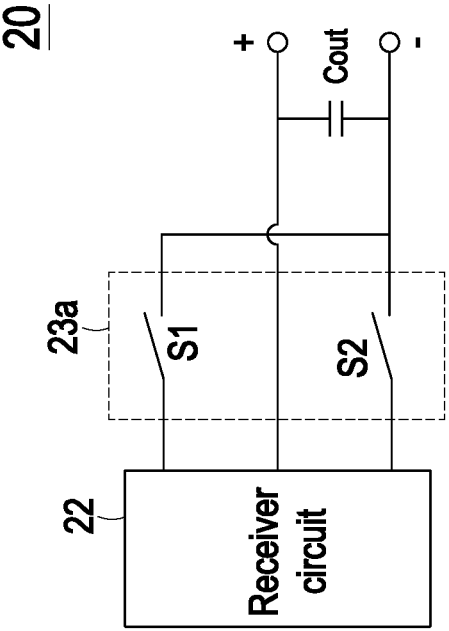
Figure 3D:
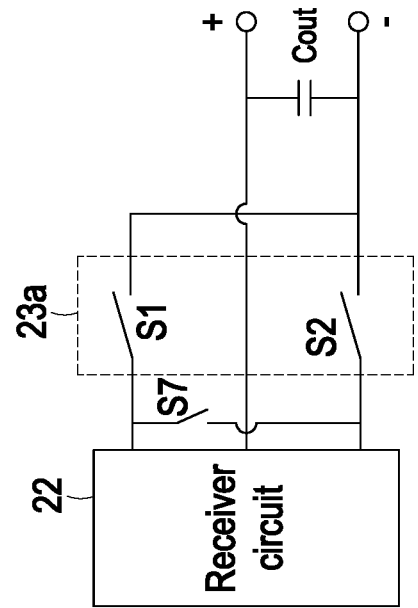
Figure 3C:
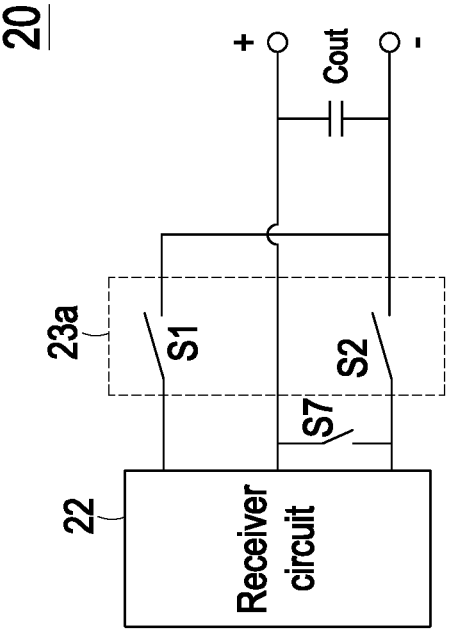
Figure 3E:
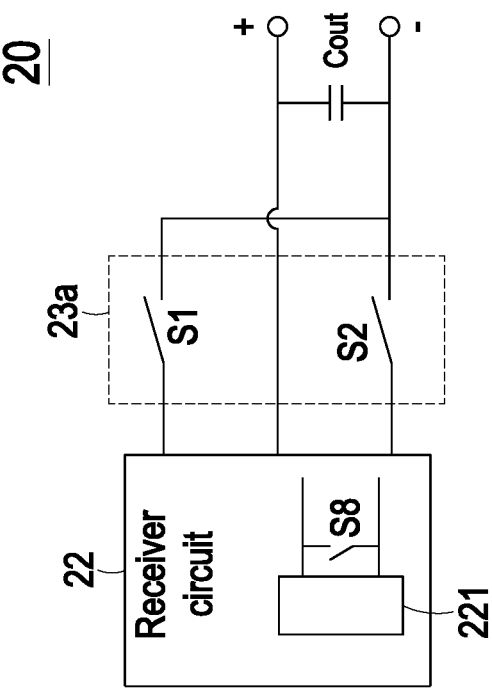

In the above example, the main power circuit 21 is short-circuited by turning on the first switch S1 or turning on the second switch S2 under control of the rectifier circuit 23a. In some other embodiments, the main power circuit 21 further comprises a bidirectional switch. The main power circuit 21 is short-circuited by turning on the bidirectional switch. In the example of FIG. 3B, the bidirectional switch S7 is electrically coupled between the first terminal and the second terminal of the receiver circuit 22. In the example of FIG. 3C, the bidirectional switch S7 is electrically coupled between the second terminal and the third terminal of the receiver circuit 22. In the example of FIG. 3D, the bidirectional switch S7 is electrically coupled between the first terminal and the third terminal of the receiver circuit 22. In other words, the bidirectional switch S7 is electrically coupled between any two terminals of the first terminal, the second terminal and the third terminal of the receiver circuit 22. In case that the receiver unit 20 is abnormal, the bidirectional switch S7 is turned on under control of the main power circuit 21. Consequently, in case that the output capacitor Cout is not short-circuited, and the main power circuit 21 is short-circuited. In the example of FIG. 3E, the receiver circuit 22 comprises a receiver coil 221 and a bidirectional switch S8. The bidirectional switch S8 is electrically coupled between two terminals of the receiver coil 221. In case that the receiver unit 20 is abnormal, the bidirectional switch S8 is turned on under control of the receiver circuit 22. Consequently, in case that the output capacitor Cout is not short-circuited, and the main power circuit 21 is short-circuited.

Figure 4A:
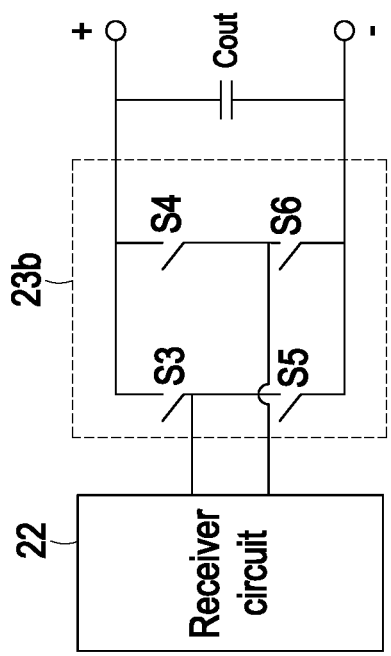
FIGS. 4A, 4B and 4C are schematic circuit diagrams illustrating some examples of the receiver unit of the wireless power transmission device according to the embodiment of the present disclosure.
Figure 4C:
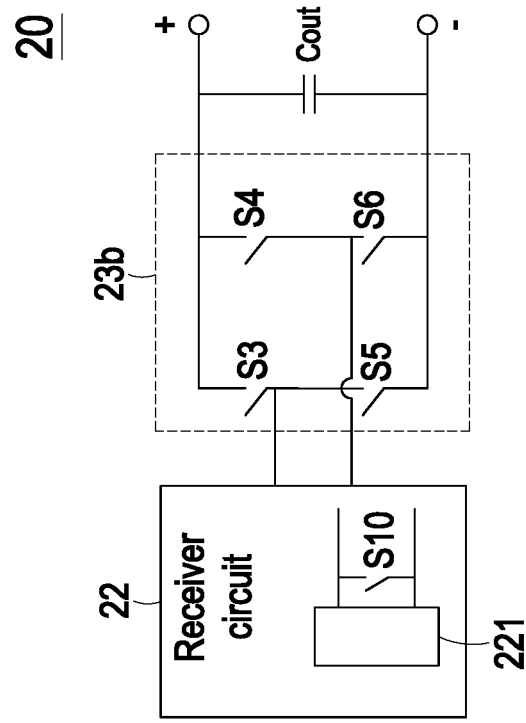
Figure 4B:
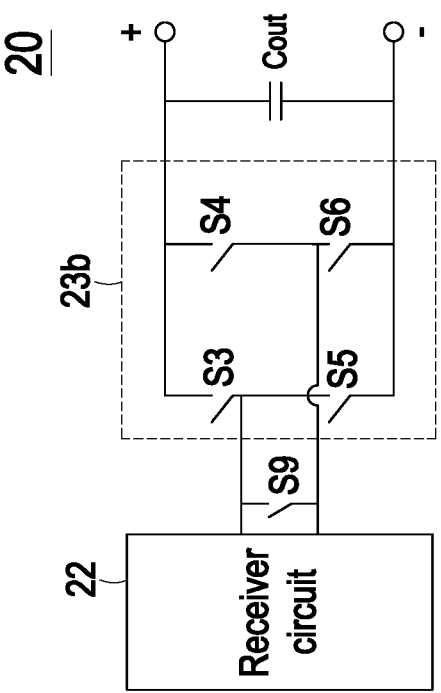

FIGS. 4A, 4B and 4C are schematic circuit diagrams illustrating some examples of the receiver unit of the wireless power transmission device according to the embodiment of the present disclosure. As shown in FIG. 4A, the rectifier circuit 23b is a full-bridge rectifier circuit comprising a third switch S3, a fourth switch S4, a fifth switch S5 and a sixth switch S6. The third switch S3 and the fifth switch S5 are coupled with each other in series to be formed as a first bridge arm. The third switch S3 is electrically coupled with a first terminal of the output capacitor Cout. The fifth switch S5 is electrically coupled with a second terminal of the output capacitor Cout. The fourth switch S4 and the sixth switch S6 are coupled with each other in series to be formed as a second bridge arm. The fourth switch S4 is electrically coupled with the first terminal of the output capacitor Cout. The sixth switch S6 is electrically coupled with the second terminal of the output capacitor Cout. A first terminal of the receiver circuit 22 is electrically coupled with the common node between the third switch S3 and the fifth switch S5. A second terminal of the receiver circuit 22 is electrically coupled with the common node between the fourth switch S4 and the sixth switch S6. In case that the receiver unit 20 is abnormal, the main power circuit 21 is short-circuited by turning on the third switch S3 and the fourth switch S4 or turning on the fifth switch S5 and the sixth switch S6 under control of the rectifier circuit 23b.

In the above example, the main power circuit 21 is short-circuited by selectively turning on the switches S1, S2, S3 and S4 under control of the rectifier circuit 23b. In some other embodiments, the main power circuit 21 further comprises a bidirectional switch. The main power circuit 21 is short-circuited by turning on the bidirectional switch. In the example of FIG. 4B, the bidirectional switch S9 is electrically coupled between the first terminal and the second terminal of the receiver circuit 22. In case that the receiver unit 20 is abnormal, the bidirectional switch S9 is turned on under control of the main power circuit 21. Consequently, in case that the output capacitor Cout is not short-circuited, and the main power circuit 21 is short-circuited. In the example of FIG. 4C, the receiver circuit 22 comprises a receiver coil 221 and a bidirectional switch S10. The bidirectional switch S10 is electrically coupled between two terminals of the receiver coil 221. In case that the receiver unit 20 is abnormal, the bidirectional switch S10 is turned on under control of the receiver circuit 22. Consequently, in case that the output capacitor Cout is not short-circuited, and the main power circuit 21 is short-circuited.

Figure 5:
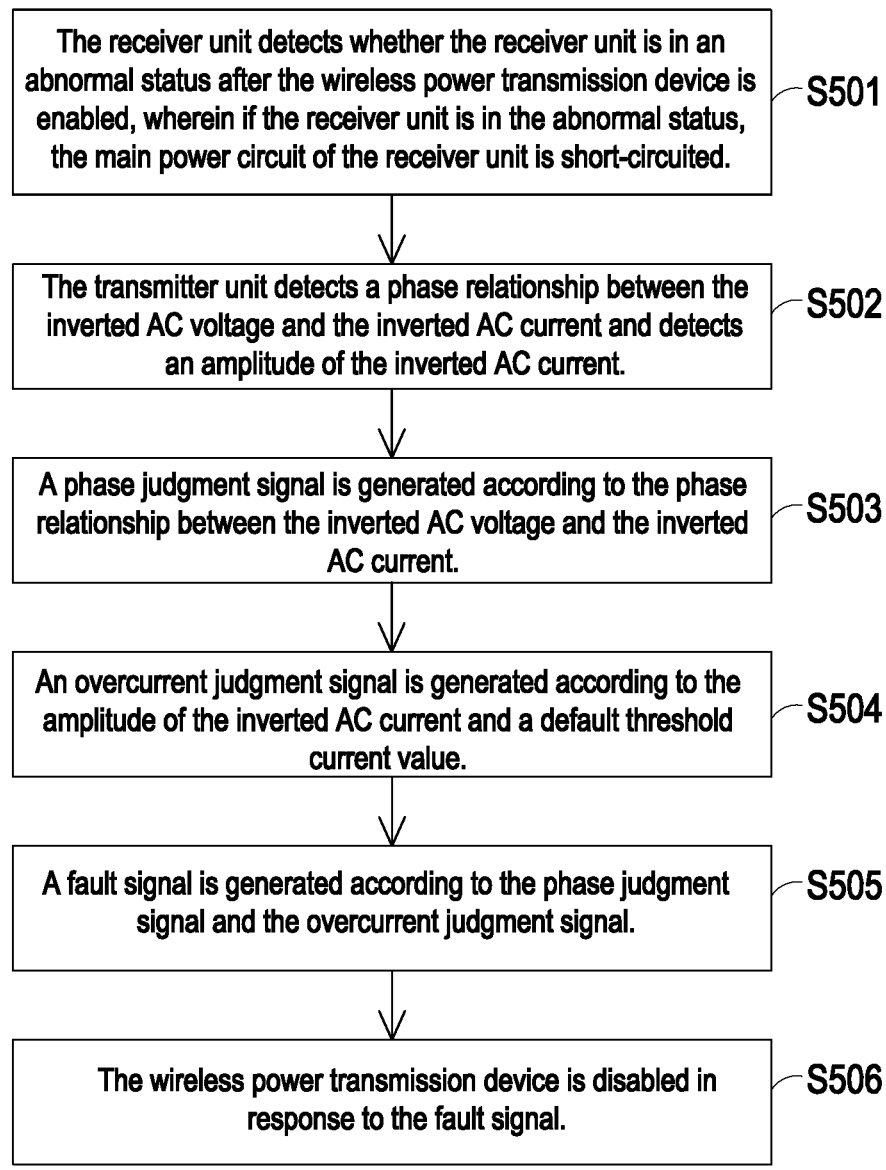
FIG. 5 is a flowchart illustrating a fault protection method for the wireless power transmission device of FIG. 1.

FIG. 5 is a flowchart illustrating a fault protection method for the wireless power transmission device of FIG. 1.

After the wireless power transmission device 1 starts to work, whether the receiver unit 20 is abnormal is detected. When the receiver unit 20 is abnormal, the main power circuit 21 of the receiver unit 20 is short-circuited (Step S501).

Then, in a step S502, the transmitter unit 10 detects a phase relationship between the inverted AC voltage and the inverted AC current and detects an amplitude of the inverted AC current.

Then, in a step S503, a phase judgment signal is generated according to the phase relationship between the inverted AC voltage and the inverted AC current. The phase judgment signal indicates whether the phase of the inverted AC current leads the phase of the inverted AC voltage, or indicates whether the phase of the inverted AC current lags the phase of the inverted AC voltage by more than 90 degrees. For example, the phase detection circuit 31 realizes the phase relationship between the inverted AC voltage and the inverted AC current according to comparison. If the phase of the inverted AC current leads the phase of the inverted AC voltage or the phase of the inverted AC current lags the phase of the inverted AC voltage by more than 90 degrees, a phase judgment signal with high level is generated. Whereas, if the phase of the inverted AC current lags the phase of the inverted AC voltage by less than 90 degrees, a phase judgment signal with low level is generated.

Then, an overcurrent judgment signal is generated according to the amplitude of the inverted AC current and a predetermined current threshold (Step S504). In the step S504, the amplitude detection circuit compares the amplitude of the inverted AC current with the predetermined current threshold. If the amplitude of the inverted AC current is higher than the predetermined current threshold, an overcurrent judgment signal with high level is generated. Whereas, if the amplitude of the inverted AC current is lower than the predetermined current threshold, an overcurrent judgment signal with low level is generated.

Then, in a step S505, a fault signal is generated according to the phase judgment signal and the overcurrent judgment signal. In the step S505, the phase judgment signal and the overcurrent judgment signal are calculated by logic OR operation. If any of the phase judgment signal and the overcurrent judgment signal is in the high-level state, the fault signal is generated.

Afterwards, the wireless power transmission device 1 is controlled to shut down in response to the fault signal (Step S506). Consequently, in case that the receiver unit 20 is abnormal, quick protection of the wireless power transmission device 1 can be achieved.

After the step S502, the sequence of the step S503 and the step S504 is interchangeable. In addition, the step S505 is performed after the step S503 and the step S504 are performed.

From the above descriptions, the present disclosure provides a fault protection method for a wireless power transmission device. In case that the receiver unit 20 is abnormal, the main power circuit 21 of the receiver unit 20 is short-circuited. After the amplitude of the inverted AC current and the phase relationship between the inverted AC voltage and the inverted AC current are detected, the transmitting side of the wireless power transmission device 1 realizes that the receiver unit 20 is abnormal. In addition, the fault signal is generated. The wireless power transmission device 1 is controlled to shut down in response to the generated fault signal. In other words, the transmitting side of the wireless power transmission device 1 can realize that the receiver unit 20 is abnormal and disable the wireless power transmission device 1 in order to protect the wireless power transmission device 1. Since it is not necessary to transmit a signal from the receiver unit 20 to notify the transmitter unit 10 that the receiver unit 20 is abnormal, the efficacy of quickly protecting the wireless power transmission device 1 is not restricted by the speed and stability of transmitting the signal. Moreover, in case that the receiver unit 20 is abnormal, the transmitting side generates the fault signal according to the phase judgment signal and the overcurrent judgment signal. Consequently, regardless of the working state of the wireless power transmission device 1, quick protection of the wireless power transmission device 1 can be achieved. Since the wireless power transmission device 1 in all working states can be protected by the fault protection method of the aforementioned embodiments, the applications of the fault protection method are expansive.

Figure 6:
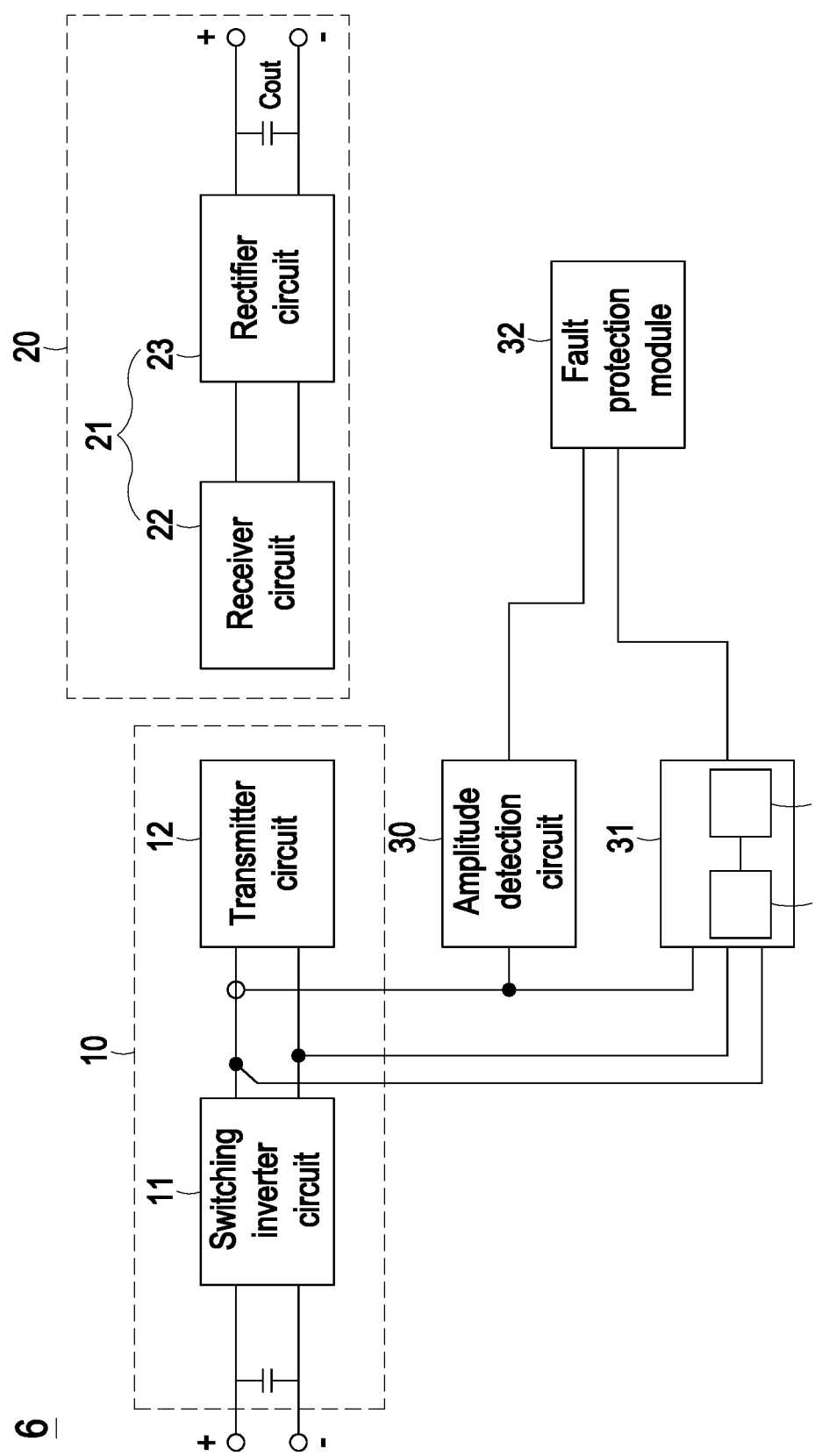
FIG. 6 is a schematic circuit diagram illustrating a variant example of the wireless power transmission device of FIG. 1.

FIG. 6 is a schematic circuit diagram illustrating a variant example of the wireless power transmission device of FIG. 1. Component parts and elements corresponding to those of FIG. 1 are designated by identical numeral references, and detailed description thereof is omitted. In comparison with FIG. 1, the phase detection circuit 31 of the wireless power transmission device 6 comprises a phase generating circuit 311 and a phase judgment circuit 312.

The phase judgment circuit 312 is electrically coupled with the output terminal of the phase generating circuit 311. The phase generating circuit 311 generates a first judgment signal and a second judgment signal according to the phase relationship between the inverted AC voltage and the inverted AC current. The phase judgment circuit 312 generates the phase judgment signal according to the first judgment signal and the second judgment signal. The first judgment signal indicates whether the phase of the inverted AC current leads the phase of the inverted AC voltage. The second judgment signal indicates whether the phase of the inverted AC current lags the phase of the inverted AC voltage by more than 90 degrees. For example, the phase generating circuit 311 realizes whether the phase of the inverted AC voltage leads or lags the phase of the inverted AC current according to comparison. If the phase of the inverted AC current leads the phase of the inverted AC voltage, the phase generating circuit 311 generates a first judgment signal with high level and a second judgment signal with low level. If the phase of the inverted AC current lags the phase of the inverted AC voltage by more than 90 degrees, the phase judgment circuit 312 generates a first judgment signal with low level and a second judgment signal with high level. If the phase of the inverted AC current lags the phase of the inverted AC voltage by less than 90 degrees, the phase judgment circuit 312 generates a first judgment signal with low level and a second judgment signal with low level. Moreover, if at least one of the first judgment signal and the second judgment signal is in the high level state, the phase judgment circuit 312 generates the phase judgment signal with high level. If both of the first judgment signal and the second judgment signal are in the low level state, the phase judgment circuit 312 generates the phase judgment signal with low level.

Figure 7:
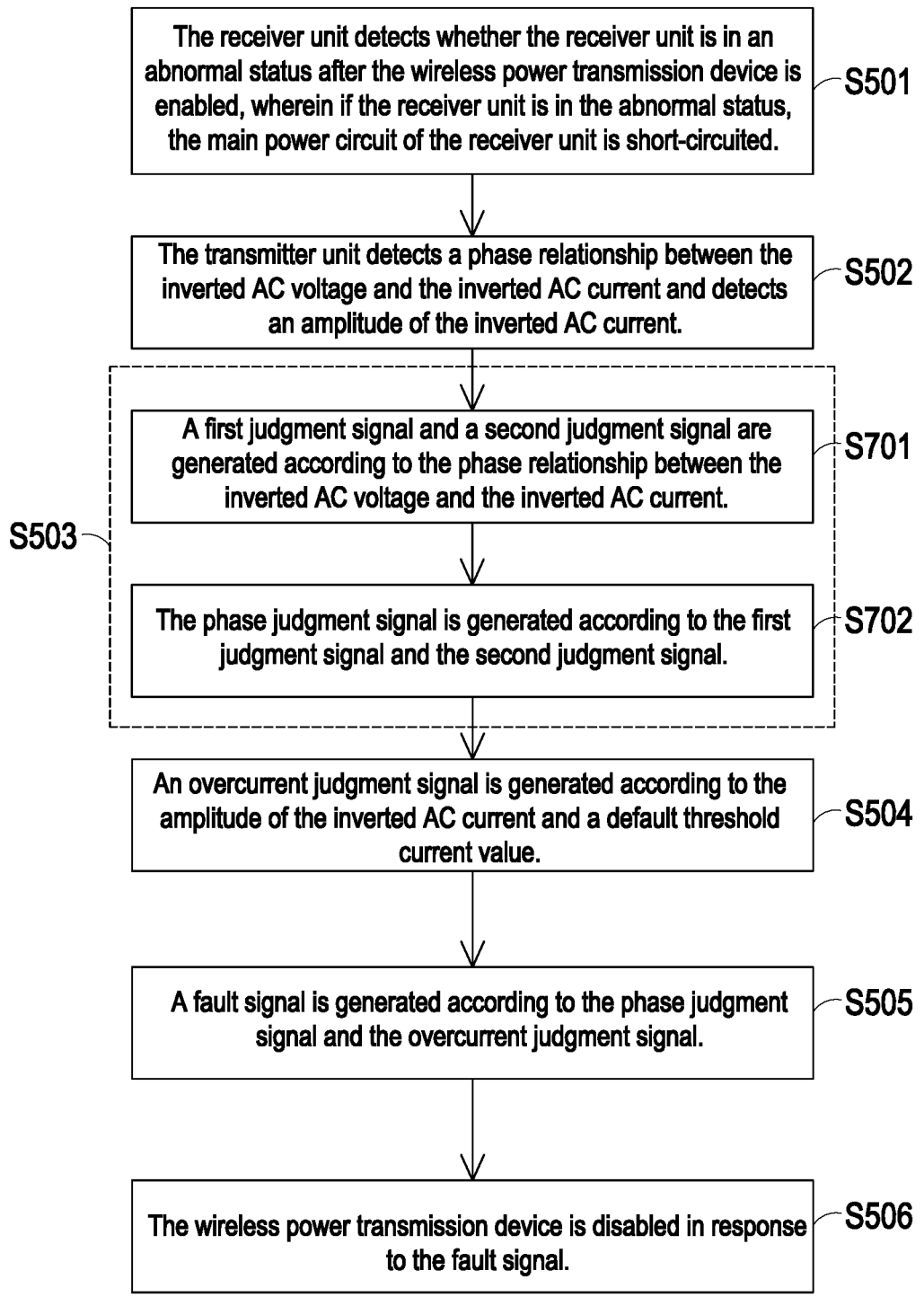
FIG. 7 is a flowchart illustrating a variant example of the fault protection method of FIG. 5.

FIG. 7 is a flowchart illustrating a variant example of the fault protection method of FIG. 5. The fault protection method is applied to the wireless power transmission device of FIG. 6. Component parts and elements corresponding to those of FIG. 5 are designated by identical numeral references, and detailed description thereof is omitted. In this embodiment, the step S503 of the fault protection method further comprises the step S701 and the step S702.

In the step S701, a first judgment signal and a second judgment signal are generated according to the phase relationship between the inverted AC voltage and the inverted AC current. If the phase of the inverted AC current leads the phase of the inverted AC voltage, the phase generating circuit 311 generates a first judgment signal with high level and a second judgment signal with low level. If the phase of the inverted AC current lags the phase of the inverted AC voltage by more than 90 degrees, the phase generating circuit 311 generates a first judgment signal with low level and a second judgment signal with high level. If the phase of the inverted AC current lags the phase of the inverted AC voltage by less than 90 degrees, the phase generating circuit 311 generates a first judgment signal with low level and a second judgment signal with low level.

In the step S702, the phase judgment signal is generated according to the first judgment signal and the second judgment signal. Moreover, if at least one of the first judgment signal and the second judgment signal is in the high level state, the phase judgment circuit 312 generates the phase judgment signal with high level. If both of the first judgment signal and the second judgment signal are in the low level state, the phase judgment circuit 312 generates the phase judgment signal with low level.

Figure 8:
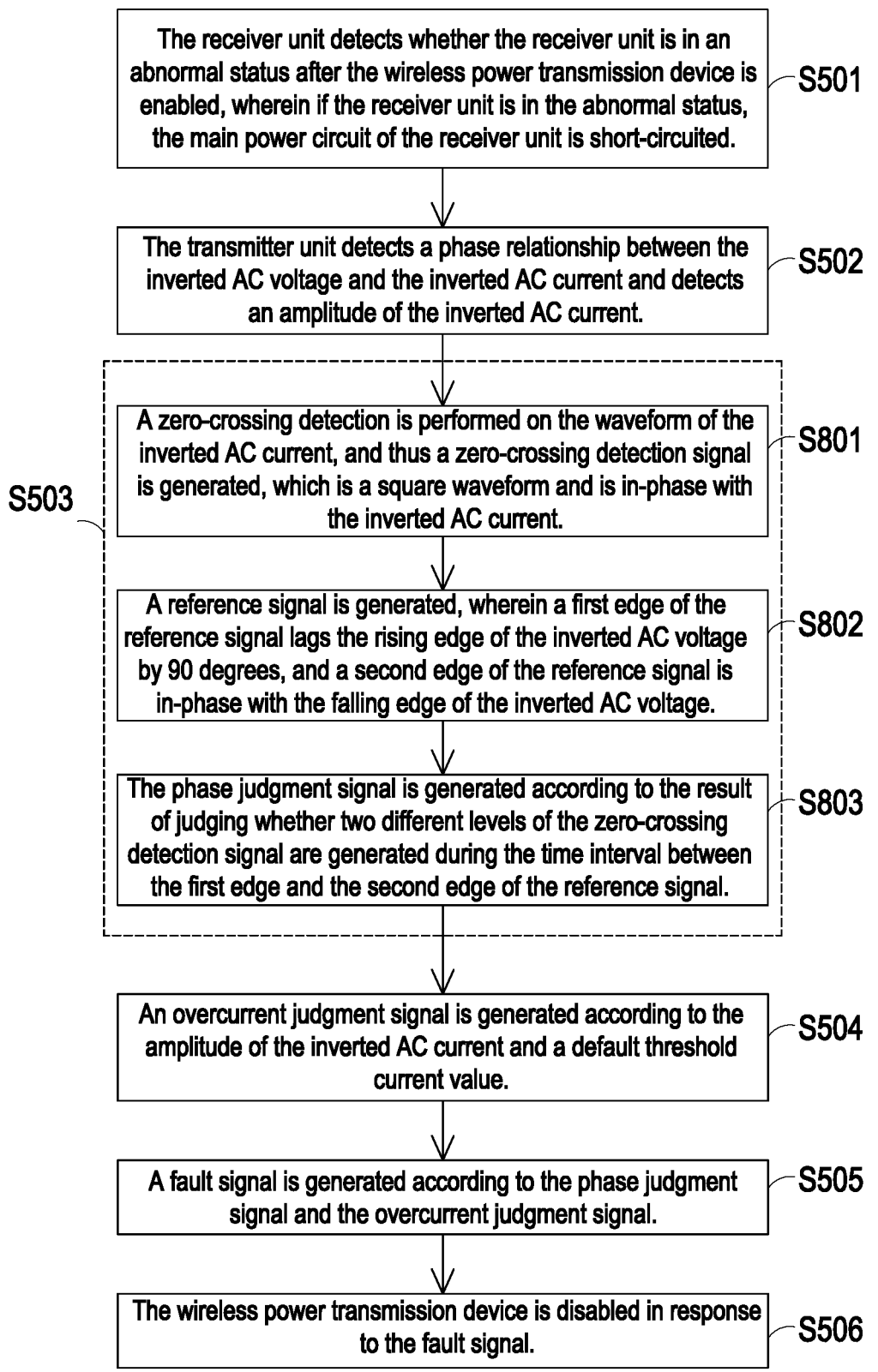
FIG. 8 is a flowchart illustrating another variant example of the fault protection method of FIG. 5.

FIG. 8 is a flowchart illustrating another variant example of the fault protection method of FIG. 5. Component parts and elements corresponding to those of FIG. 5 are designated by identical numeral references, and detailed description thereof is omitted. In this embodiment, the step S503 of the fault protection method further comprises the step S801, the step S802 and the step S803.

In the step S801, a zero-crossing detection is performed on the waveform of the inverted AC current, and thus a zero-crossing detection signal is generated, which is a square waveform and is in-phase with the inverted AC current.

In the step S802, a reference signal is generated. A first edge of the reference signal lags the rising edge of the inverted AC voltage by 90 degrees. A second edge of the reference signal is in-phase with the falling edge of the inverted AC voltage. In an embodiment, the reference signal is generated according to a driving signal for driving plural switches of the switching inverter circuit 11.

The step S803 is performed to judge whether the zero-crossing detection signal exists two different levels during the time interval between the first edge and the second edge of the reference signal. Moreover, the phase judgment signal is generated according to the judging result. If the judging result of the step S803 is not satisfied, a phase judgment signal with low level is generated. Whereas, if judging result of the step S803 is satisfied, a phase judgment signal with high level is generated. The phase judgment signal with high level indicates that the receiver unit 20 of the wireless power transmission device 6 occurs the fault.

Figure 9B:
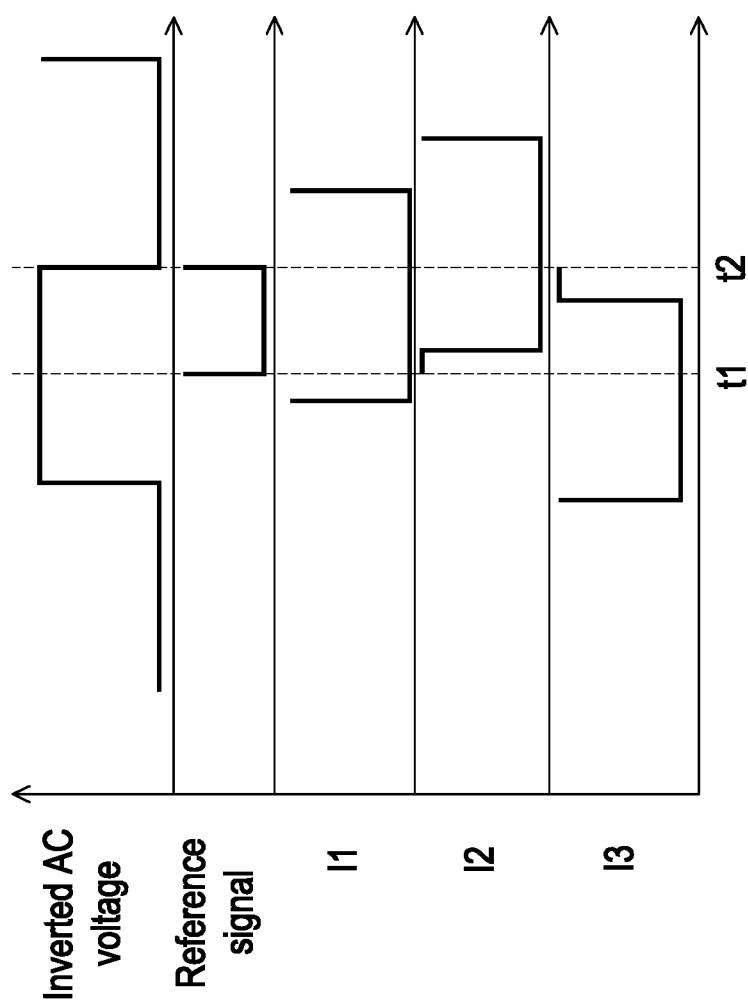

FIGS. 9A and 9B are schematic timing waveform diagrams illustrating the inverted AC voltage, the reference signal and the zero-crossing detection signal processed by the fault protection method of FIG. 8. As mentioned above, the first edge of the reference signal lags the rising edge of the inverted AC voltage by 90 degrees, and the second edge of the reference signal is in-phase with the falling edge of the inverted AC voltage. The time interval between the time point t1 and the time point t2 is the time duration between the first edge and the second edge of the reference signal.

When the wireless power transmission device is in the normal status, the phase of the inverted AC current lags the phase of the inverted AC voltage by less than 90 degrees. Meanwhile, the zero-crossing detection signal is I1. During the time interval between the time point t1 and the time point t2, the zero-crossing detection signal I1 has only one level. That is, the waveform of the zero-crossing detection signal I1 is identical to the waveform of the reference signal.

In case that the receiver unit 20 of the wireless power transmission device is abnormal, the phase of the inverted AC current lags the phase of the inverted AC voltage by more than 90 degrees, or the phase of the inverted AC current leads the phase of the inverted AC voltage. If the phase of the inverted AC current lags the phase of the inverted AC voltage by more than 90 degrees, the zero-crossing detection signal is I2. During the time interval between the time point t1 and the time point t2, the zero-crossing detection signal I2 exists two different levels. That is, a portion of the waveform of the zero-crossing detection signal I2 is different from the waveform of the reference signal. If the phase of the inverted AC current leads the phase of the inverted AC voltage, the zero-crossing detection signal is I3. During the time interval between the time point t1 and the time point t2, the zero-crossing detection signal I3 exists two different levels. That is, a portion of the waveform of the zero-crossing detection signal I3 is different from the waveform of the reference signal.

That is, if the wireless power transmission device is normal, the zero-crossing detection signal I1 has single level state during the time interval between the time point t1 and the time point t2. That is, the waveform of the zero-crossing detection signal I1 is identical to the waveform of the reference signal during the time interval between the time point t1 and the time point t2. On the contrary, if the receiver unit 20 of the wireless power transmission device is abnormal, the zero-crossing detection signal I2 or I3 exists two different levels during the time interval between the time point t1 and the time point t2. That is, a portion of the waveform of the zero-crossing detection signal I2 or I3 is different from the waveform of the reference signal. By judging whether the zero-crossing detection signal exists two different levels during the time interval between the first edge and the second edge of the reference signal, the fault protection method can realize whether the wireless power transmission device is normal or the receiver unit 20 of the wireless power transmission device is abnormal.

In the example of FIG. 9A, the first edge of the reference signal is the rising edge, and the second edge of the reference signal is the falling edge. During the time interval between the first edge and the second edge of the reference signal (e.g., the time interval between the time point t1 and the time point t2), the reference signal is in the high level state. Under this circumstance, the zero-crossing detection signal I1 is in the high level state and the waveform of the zero-crossing detection signal I1 is identical to the waveform of the reference signal. The zero-crossing detection signal I2 or I3 exists two different levels, i.e., in the high level state and the low level state.

In the example of FIG. 9B, the first edge of the reference signal is the falling edge, and the second edge of the reference signal is the rising edge. During the time interval between the first edge and the second edge of the reference signal (e.g., the time interval between the time point t1 and the time point t2), the reference signal is in the low level state. Under this circumstance, the zero-crossing detection signal I1 is in the low level state and the waveform of the zero-crossing detection signal I1 is identical to the waveform of the reference signal. The zero-crossing detection signal I2 or I3 exists two different levels, i.e., in the high level state and the low level state.

From the above descriptions, the present disclosure provides a fault protection method for a wireless power transmission device. In case that the receiver unit is abnormal, the main power circuit of the receiver unit is short-circuited. After the amplitude of the inverted AC current and the phase relationship between the inverted AC voltage and the inverted AC current are detected, the transmitting side of the wireless power transmission device realizes that the receiver unit is abnormal. In addition, the fault signal is generated. The wireless power transmission device is controlled to shut down in response to the fault signal. In other words, the transmitting side of the wireless power transmission device can realize that the receiver unit is abnormal and disable the wireless power transmission device in order to protect the wireless power transmission device. Since it is not necessary to transmit a signal from the receiver unit to notify the transmitter unit that the receiver unit is abnormal, the efficacy of quickly protecting the wireless power transmission device is not restricted by the speed and stability of transmitting the signal. Moreover, in case that the receiver unit is abnormal, the transmitting side generates the fault signal according to the phase judgment signal and the overcurrent judgment signal. Consequently, regardless of the working state of the wireless power transmission device, quick protection of the wireless power transmission device can be achieved. Since the wireless power transmission device in all working states can be protected by the fault protection method of the aforementioned embodiments, the applications of the fault protection method are expansive.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fault protection method for a wireless power transmission device, the wireless power transmission device comprising a transmitter unit and a receiver unit, the transmitter unit receiving an input DC power and comprising a switching inverter circuit for converting the input DC power into an inverted AC power, the receiver unit comprising a main power circuit, the main power circuit comprising a rectifier circuit, wherein the rectifier circuit is a full-bridge rectifier circuit comprising a first bridge arm and a second bridge arm coupled with each other in parallel, the first bridge arm comprises a third switch and a fifth switch serial with each other, and the second bridge arm comprises a fourth switch and a sixth switch serial with each other, the third switch is electrically coupled with a first terminal of an output capacitor, and the fifth switch is electrically coupled with a second terminal of the output capacitor, the fourth switch is electrically coupled with the first terminal of the output capacitor, the sixth switch is electrically coupled with the second terminal of the output capacitor, the fault protection method comprising:

(a) detecting whether the receiver unit is abnormal after the wireless power transmission device starts to work, and when the receiver unit is abnormal, the main power circuit of the receiver unit is short-circuited;

(b) the transmitter unit detecting a phase relationship between an inverted AC voltage and an inverted AC current of the inverted AC power and detecting an amplitude of the inverted AC current;

(c) generating a phase judgment signal according to the phase relationship between the inverted AC voltage and the inverted AC current;

(d) generating an overcurrent judgment signal according to the amplitude of the inverted AC current and a predetermined current threshold;

(e) generating a fault signal according to the phase judgment signal and the overcurrent judgment signal; and (f) controlling the wireless power transmission device to shut down in response to the fault signal.

2. The fault protection method according to claim 1, wherein in the step (e), the phase judgment signal and the overcurrent judgment signal are calculated by logic OR operation to generate the fault signal.

3. The fault protection method according to claim 1, wherein in the step (c), a first judgment signal and a second judgment signal are generated according to the phase relationship between the inverted AC voltage and the inverted AC current, and the phase judgment signal is generated according to the first judgment signal and the second judgment signal, wherein the first judgment signal indicates whether the phase of the inverted AC current leads the phase of the inverted AC voltage, and the second judgment signal indicates whether the phase of the inverted AC current lags the phase of the inverted AC voltage by more than 90 degrees.

4. The fault protection method according to claim 1, wherein the transmitter unit comprises a transmitter circuit, which is electrically coupled with an output terminal of the switching inverter circuit, and the main power circuit further comprises a receiver circuit corresponding to the transmitter circuit, and an output terminal of the main power circuit is electrically coupled with the output capacitor.

5. The fault protection method according to claim 4, wherein the rectifier circuit is electrically coupled with the receiver circuit.

6. The fault protection method according to claim 5,
wherein a first terminal of the receiver circuit is electrically coupled with a common node between the third switch and the fifth switch, and a second terminal of the receiver circuit is electrically coupled with a common node between the fourth switch and the sixth switch.

7. The fault protection method according to claim 6, wherein in the step (a), the main power circuit is short-circuited by turning on the third switch and the fourth switch or turning on the fifth switch and the sixth switch.

8. The fault protection method according to claim 6, wherein the main power circuit further comprises a bidirectional switch, and the bidirectional switch is electrically coupled between the first terminal and the second terminal of the receiver circuit, wherein in the step (a), the main power circuit is short-circuited by turning on the bidirectional switch.

9. The fault protection method according to claim 4, wherein the receiver circuit comprises a bidirectional switch and a receiver coil, and the bidirectional switch is electrically coupled between two terminals of the receiver coil, wherein in the step (a), the main power circuit is short-circuited by turning on the bidirectional switch.

10. The fault protection method according to claim 1, wherein the step (c) further comprises steps of:
(c1) performing a zero-crossing detection on the inverted AC current, and generating a zero-crossing detection signal which is a square waveform and is in-phase with the inverted AC current;
(c2) generating a reference signal, wherein a first edge of the reference signal lags the rising edge of the inverted AC voltage by 90 degrees, and a second edge of the reference signal is in-phase with the falling edge of the inverted AC voltage; and
(c3) generating the phase judgment signal according to a result of judging whether the zero-crossing detection signal exists two different levels during a time interval between the first edge and the second edge of the reference signal, and when the zero-crossing detection signal exists two different levels, the receiver unit of the wireless power transmission device occurs a fault.

11. The fault protection method according to claim 10, wherein in the step (c2), the reference signal is generated according to a driving signal for driving the switching inverter circuit.

12. A wireless power transmission device, comprising:
a transmitter unit receiving an input DC power, wherein the transmitter unit comprises a switching inverter circuit for converting the input DC power into an inverted AC power;
a receiver unit comprising a main power circuit, wherein the main power circuit comprises a rectifier circuit, the rectifier circuit is a full-bridge rectifier circuit comprising a first bridge arm and a second bridge arm parallel with each other, wherein the first bridge arm comprises a third switch and a fifth switch serial with each other, and the second bridge arm comprises a fourth switch and a sixth switch serial with each other, the third switch is electrically coupled with a first terminal of an output capacitor, the fifth switch is electrically coupled with a second terminal of the output capacitor, and the fourth switch is electrically coupled with the first terminal of the output capacitor, the sixth switch is electrically coupled with the second terminal of the output capacitor;
a phase detection circuit electrically coupled with an output terminal of the switching inverter circuit, wherein the phase detection circuit detects a phase relationship between an inverted AC voltage and an inverted AC current of the inverted AC power and generates a phase judgment signal according to the phase relationship;
an amplitude detection circuit electrically coupled with the output terminal of the switching inverter circuit, wherein the amplitude detection circuit detects an amplitude of the inverted AC current and generates an overcurrent judgment signal according to the amplitude of the inverted AC current and a predetermined current threshold; and
a fault protection module electrically coupled with the phase detection circuit and the amplitude detection circuit, and receiving the phase judgment signal and the overcurrent judgment signal,
wherein if the receiver unit is abnormal, the main power circuit is short-circuited and the fault protection module generates a fault signal according to the phase judgment signal and the overcurrent judgment signal, and the wireless power transmission device is disabled in response to the generated fault signal.

13. The wireless power transmission device according to claim 12, wherein the phase detection circuit comprises:
a phase generating circuit for generating a first judgment signal and a second judgment signal according to the phase relationship between the inverted AC voltage and the inverted AC current; and
a phase judgment circuit for generating the phase judgment signal according to the first judgment signal and the second judgment signal,
wherein the first judgment signal indicates whether the phase of the inverted AC current leads the phase of the inverted AC voltage, and the second judgment signal indicates whether the phase of the inverted AC current lags the phase of the inverted AC voltage by more than 90 degrees.

14. The wireless power transmission device according to claim 12, wherein the transmitter unit comprises a transmitter circuit, and the transmitter circuit is electrically coupled with the output terminal of the switching inverter circuit, wherein the main power circuit further comprises a receiver circuit corresponding to the transmitter circuit, and an output terminal of the main power circuit is electrically coupled with output capacitor.

15. The wireless power transmission device according to claim 14, wherein the rectifier circuit is electrically coupled with the receiver circuit.

16. The wireless power transmission device according to claim 15, wherein a first terminal of the receiver circuit is electrically coupled with a common node between the third switch and the fifth switch, and a second terminal of the receiver circuit is electrically coupled with a common node between the fourth switch and the sixth switch.

17. The wireless power transmission device according to claim 16, wherein the main power circuit is short-circuited by turning on the third switch and the fourth switch or turning on the fifth switch and the sixth switch under control of the full-bridge rectifier circuit.

18. The wireless power transmission device according to claim 16, wherein the main power circuit further comprises a bidirectional switch, and the bidirectional switch is electrically coupled between first terminal and second terminal of the receiver circuit, and the main power circuit is short-circuited by turning on the bidirectional switch.

19. The wireless power transmission device according to claim 14, wherein the receiver circuit comprises a bidirectional switch and a receiver coil, the bidirectional switch is electrically coupled between two terminals of the receiver coil, and the main power circuit is short-circuited by turning on the bidirectional switch under control of the receiver circuit.

\* \* \* \* \*